(12) United States Patent
Baur et al.

(10) Patent No.: US 6,193,198 B1
(45) Date of Patent: Feb. 27, 2001

(54) METHOD AND ARRANGEMENT FOR SECURING AN ASSEMBLY ONTO A SUPPORT USING A PRE-INSTALLED SECURING BOLT OUTFITTED WITH A SAFETY CAP

(75) Inventors: Richard Baur, Pfaffenhofen; Engelbert Woerle, Kuehbach, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/398,634

(22) Filed: Sep. 17, 1999

(30) Foreign Application Priority Data

Sep. 17, 1998 (DE) .............................................. 198 42 591

(51) Int. Cl.⁷ .................................................. A47B 96/00
(52) U.S. Cl. ................................ 248/222.41; 248/222.12
(58) Field of Search ........................ 248/222.41, 222.12, 248/223.21, 205.1

(56) References Cited

U.S. PATENT DOCUMENTS

| | | | |
|---|---|---|---|
| 2,029,089 | * 1/1936 | Weirauch | 248/223.21 |
| 3,559,940 | * 2/1971 | Kruzell | 248/222.41 |
| 4,012,686 | * 3/1977 | Heine | 248/222.41 |
| 4,266,386 | 5/1981 | Bains . | |
| 5,143,331 | * 9/1992 | Robert | 248/222.41 |
| 5,360,303 | 11/1994 | Ellmers et al. . | |

FOREIGN PATENT DOCUMENTS

| | | |
|---|---|---|
| 4221250 | 1/1994 | (DE) . |
| 0756044 | 1/1997 | (EP) . |

* cited by examiner

*Primary Examiner*—Alvin Chin-Shue
(74) *Attorney, Agent, or Firm*—W. F. Fasse; W. G. Fasse

(57) ABSTRACT

An assembly is mounted and secured on a support by at least one securing bolt that is pre-installed in the assembly and engages a keyhole-shaped opening provided in the support. The head of the bolt is inserted through the larger portion of the keyhole opening and then slidingly displaced so the bolt shaft is engaged in the narrower portion of the keyhole opening and the bolt head is secured behind the support. A safety cap is initially mounted on the bolt to cover the tool engagement surfaces of the bolt, and the cap is inserted in the opening together with the bolt. As the assembly is slidingly displaced relative to the support, the safety cap is pushed off the bolt to expose the tool engagement surfaces, by contact of stop surfaces of the safety cap with stop surfaces of the support. The safety cap thereby prevents engagement of a tightening tool with the bolt, until the bolt has surely reached its proper securing position.

21 Claims, 3 Drawing Sheets

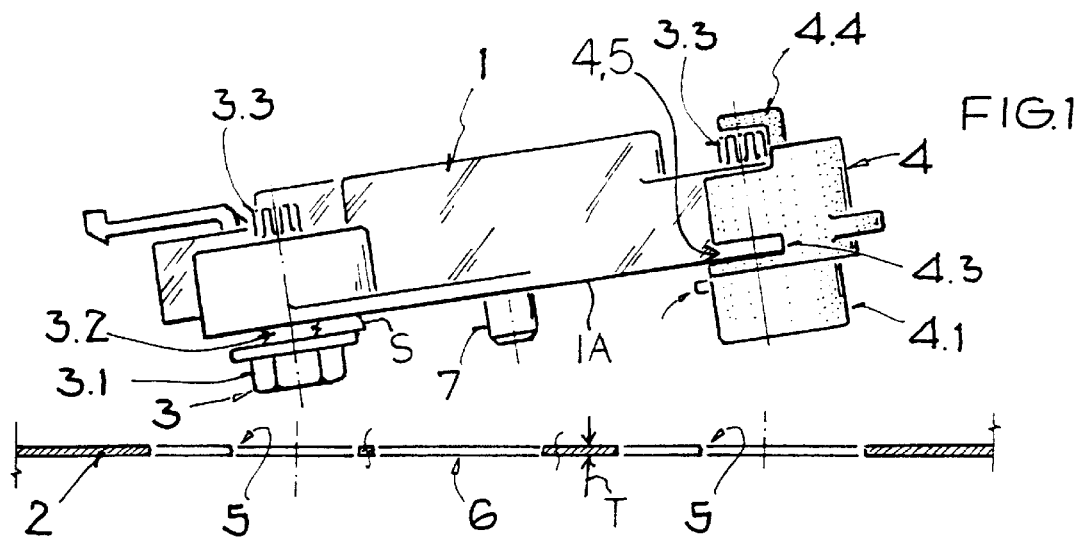
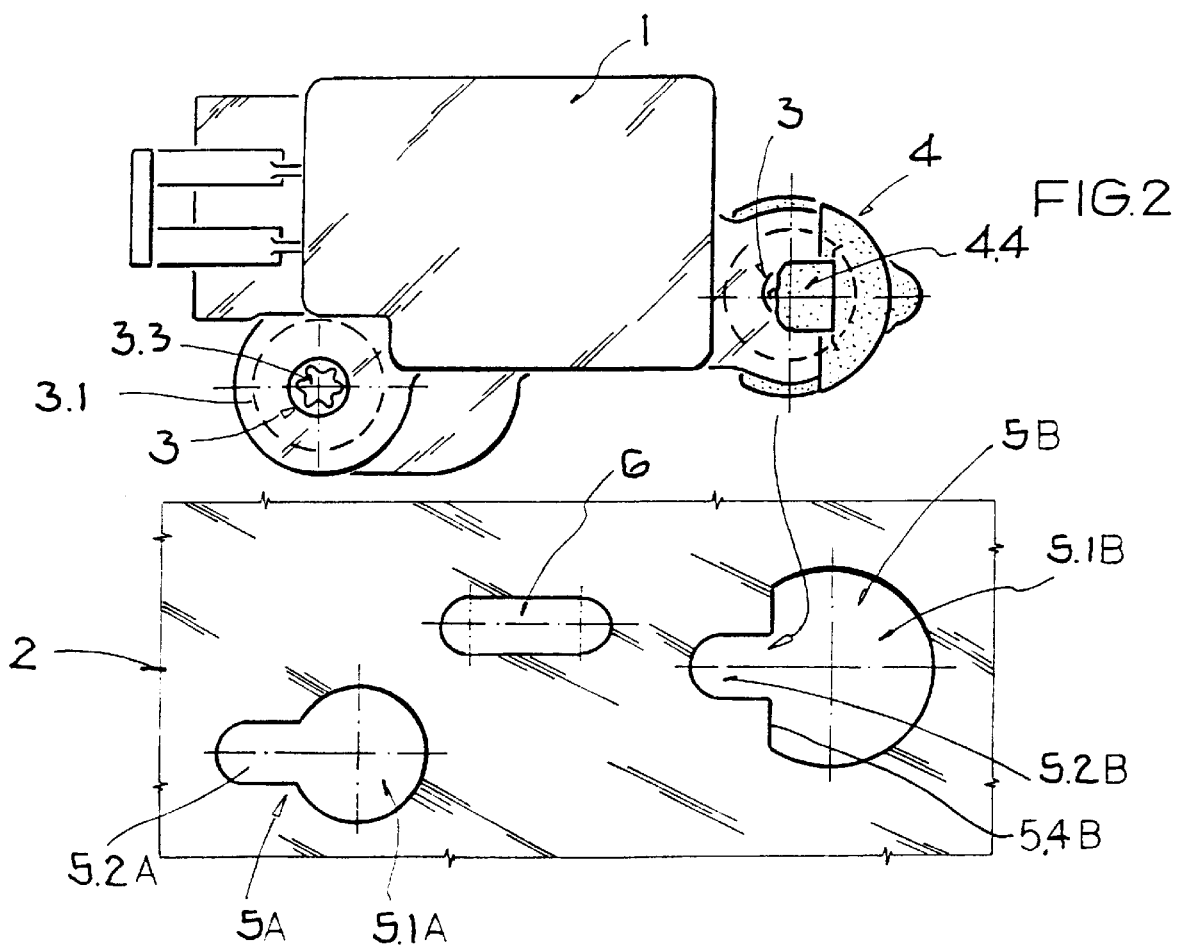

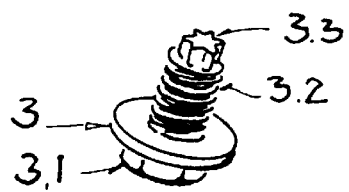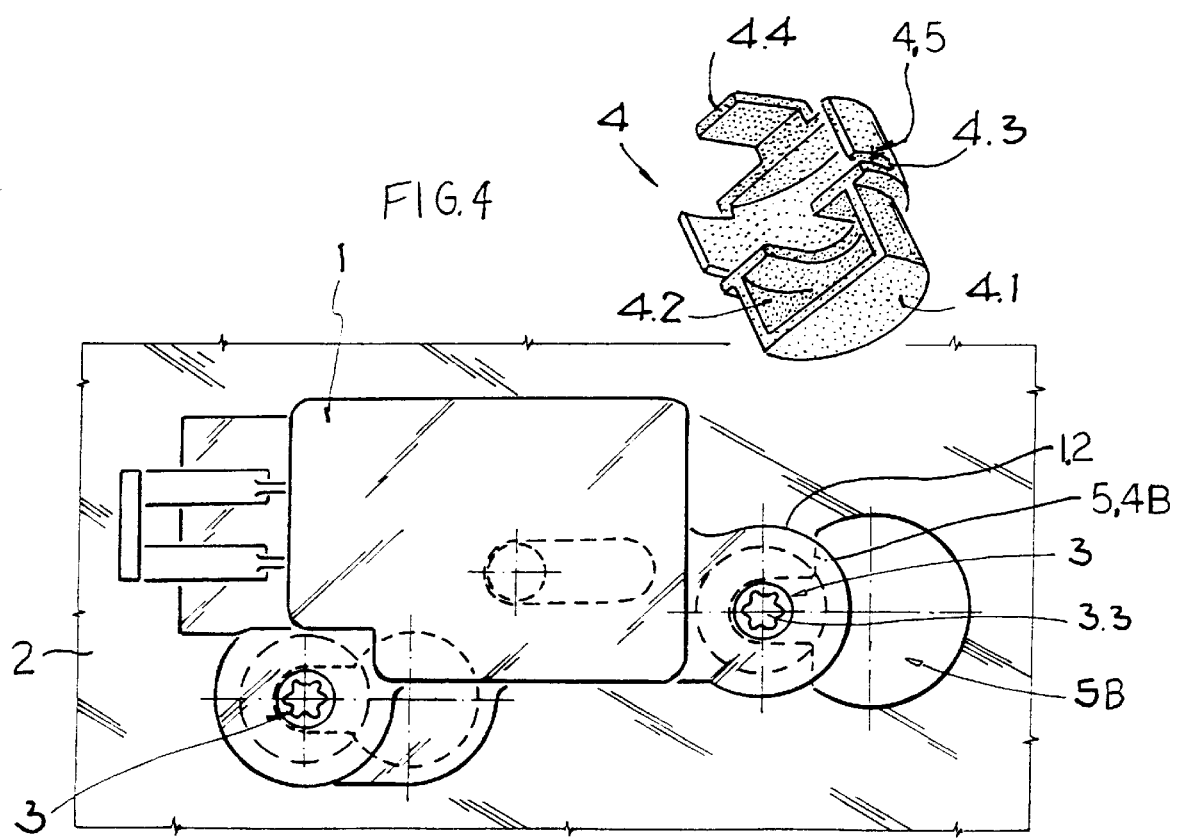

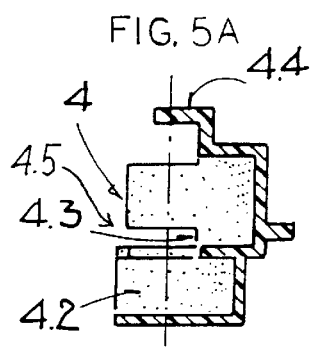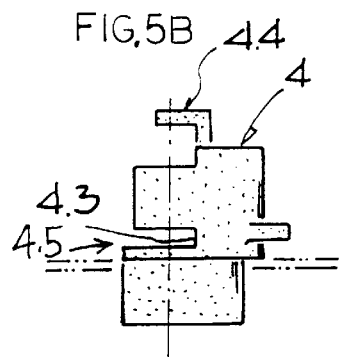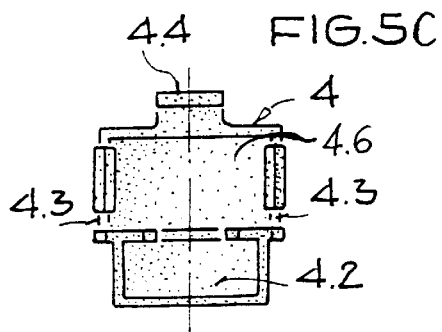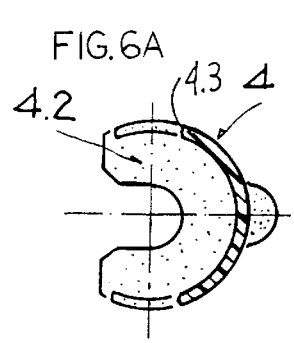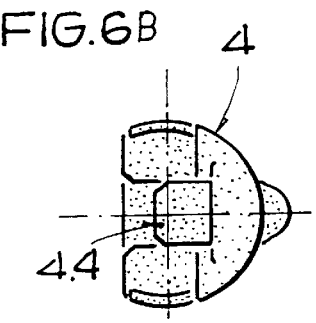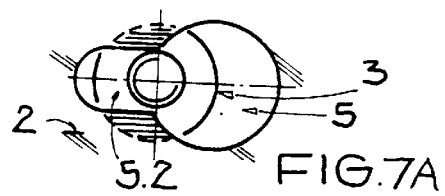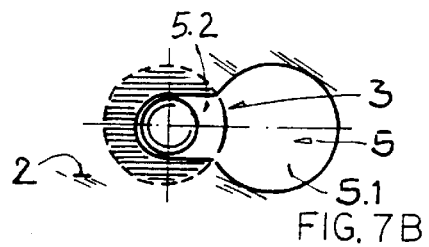

METHOD AND ARRANGEMENT FOR SECURING AN ASSEMBLY ONTO A SUPPORT USING A PRE-INSTALLED SECURING BOLT OUTFITTED WITH A SAFETY CAP

PRIORITY CLAIM

This application is based on and claims the priority under 35 U.S.C. §119 of German Patent Application 198 42 591.0, filed on Sep. 17, 1998, the entire disclosure of which is incorporated herein by reference.

FIELD OF THE INVENTION

The invention relates to a method for securing an assembly with at least one securing bolt pre-installed therein, on a support or carrier having a suitable opening for receiving the bolt. The invention also relates to a safety cap and an arrangement of a safety cap on a securing bolt.

BACKGROUND INFORMATION

It is generally known in the art that an assembly can be mounted and secured on a support by partially and loosely pre-installing securing bolts in the assembly, and then inserting and locking the heads of the securing bolts into keyhole-shaped openings provided in the support. For example, German Utility Model 297 14 824 discloses an arrangement in which at least one securing bolt is pre-installed in an assembly or component, while a respective receiving opening is provided in the support for receiving the head of each securing bolt. The opening has a keyhole shape, particularly including a first opening portion that is so dimensioned that the head of the securing bolt can pass therethrough, and a smaller elongate opening portion that is wide enough to receive the shaft of the bolt without allowing the head of the bolt to pass therethrough. Thus, the head of the bolt reaches and extends behind the rim of the assembly surrounding the smaller elongate opening portion.

To secure the assembly on the support according to the above mentioned reference, the head of each securing bolt is inserted through the larger first portion of the corresponding opening, and then the assembly is laterally shifted relative to the support so that the shaft of each securing bolt slides into the smaller elongate portion of the opening. Each securing bolt has a respective tool engagement configuration on the head thereof and also on the free shaft end thereof. The tool engagement configuration on one end of the securing bolt allows the securing bolt to be pre-installed in the assembly, and the other tool engagement configuration on the other end of the bolt allows the bolt to be tightened once it has been engaged in the narrower elongate portion of the opening.

While the above described conventional arrangements using a pre-installed securing bolt to be slidingly engaged in a keyhole-shaped opening are convenient for mounting an assembly onto a support, such arrangements all suffer a serious disadvantage, especially when the final tightening of the securing bolt is to be carried out under "blind" conditions, i.e. where the bolt head engaging the keyhole-shaped opening is not visible. Problems arise because the pre-installed securing bolt can be turned tight at any time and at any location, regardless whether or not the bolt is properly positioned relative to the keyhole-shaped opening and the assembly is properly positioned relative to the support.

Under the above-mentioned "blind" conditions, a tool such as a wrench or rachet, and particularly a pneumatic or electric power wrench, can be engaged with the bolt and can tighten the bolt even if the bolt is only partially engaged (or not at all engaged) in the narrower elongate portion of the keyhole-shaped opening. If the securing bolt is tightened in such a position, then the assembly will not be reliably secured to the support, because an inadequate contact surface will be established between the bolt head and the support. Such an improper tightened position of the bolt often cannot be recognized in the above mentioned "blind" conditions, for example when the assembly or installation is taking place in an inaccessible or covered location of a larger piece of equipment, or on a component travelling along a conveyor belt or assembly line. As a result, an improper and failure-prone mounting of the assembly on the support can easily occur and remain undetected during the manufacturing.

SUMMARY OF THE INVENTION

In view of the above it is an object of the invention to provide a method and an arrangement of components, which can ensure the proper and reliable mounting and securing of an assembly on a support. Particularly, it is an object of the invention to ensure that a securing bolt can only be tightened once it has been moved into a proper position and properly engaged relative to a keyhole-shaped opening provided in the support. The invention further aims to avoid or overcome the disadvantages of the prior art, and to achieve additional advantages, as apparent from the present specification.

The above objects have been achieved in an arrangement or combination of elements according to the invention, including: an assembly (which may be any single component or pre-assembled group of components, such as electronic components, electrical components, mechanical components, hydraulic components, etc.); a securing bolt pre-installed in the assembly; a support (which may be any supporting component on which the assembly is to be mounted) having a securing hole or opening provided therein; and a safety cap for the securing bolt. More particularly, the securing bolt includes a bolt head, a bolt shaft, and at least one tool engagement configuration such as a hex head, a Torx head, a hex socket, a Torx socket, a slotted or Phillips screwdriver head, or the like. The opening in the support has a keyhole-shape including a first larger portion through which the bolt head can be inserted, and a second narrower elongate portion extending from the first portion and having a width that is large enough to receive the bolt shaft therein, but small enough to prevent the bolt head from passing therethrough. The safety cap is initially arranged on the pre-installed securing bolt so that it covers at least the tool engagement configuration of the bolt. The safety cap is so configured that it can be inserted into the first portion of the opening together with the bolt on which it is arranged, and then when the assembly is moved relative to the support so that the bolt shaft moves into the second narrower elongate portion of the opening, the safety cap releases from and exposes the tool engagement configuration of the bolt. Especially, it is preferred that the safety cap will only release and expose the tool engagement configuration once the shaft has been completely moved to the end of the narrower elongate portion of the keyhole-shaped opening.

The above objects have further been achieved in a method according to the invention wherein the safety cap is initially arranged on the securing bolt so as to cover at least the tool engagement configuration of the bolt. Then the securing bolt, together with the safety cap arranged thereon, is inserted into the first larger portion of the opening provided in the support. Next, the assembly is moved relative to the support so that the shaft of the bolt moves into the second narrower portion of the opening. The transition or junction between the larger first portion of opening and the narrower second portion of the opening thereby acts as a stop for the safety cap. In other words, the safety cap contacts a stop rim of the support at the area where the narrower portion of the opening joins the larger portion of the opening, and thereby the safety cap is pushed off of the securing bolt as the securing bolt is moved into the narrower portion of the opening. At this time, the safety cap releases from the securing bolt and exposes the tool engagement configuration thereof. In this manner it is ensured that a tool such as a wrench or ratchet or the like can be engaged on the tool engagement configuration of the bolt so as to tighten the bolt only after the bolt has surely been moved into the proper position relative to the keyhole-shaped opening.

BRIEF DESCRIPTION OF THE DRAWINGS

In order that the invention may be clearly understood it will now be described in connection with example embodiments, with reference to the accompanying drawings, wherein:

FIG. 1 is a side elevation view of an assembly having two pre-installed securing bolts, one of which is covered with a safety cap, as the assembly is being mounted on a support;

FIG. 2 is a top view of the assembly and of the support showing the securing openings therein;

FIG. 3 is a perspective view of a securing bolt by itself;

FIG. 4 is an illustration of the assembly being mounted on the support, with the bolt shafts engaged in the narrower portions of the keyhole-openings of the support, whereby the safety cap is released from the securing bolt;

FIG. 5A is a side sectional view of the safety cap;

FIG. 5B is a side elevation view of the safety cap;

FIG. 5C is a front view of the open front of the safety cap;

FIG. 6A is a sectional top view of the safety cap;

FIG. 6B is a top plan view of the safety cap;

FIG. 7A is a partial cut-away top plan view with the assembly omitted, showing the securing bolt just beginning to be engaged in the narrower portion of the keyhole-opening; and FIG. 7B is a view corresponding to that of FIG. 7A, but showing the securing bolt completely engaged to the end of the narrower portion of the keyhole-opening.

DETAILED DESCRIPTION OF PREFERRED EXAMPLE EMBODIMENTS AND OF THE BEST MODE OF THE INVENTION

FIG. 1 shows a side view of an assembly 1, for example an electronics assembly that is to be mounted and secured on a support 2 such as a sheet metal or plate member of the chassis of a motor vehicle. In the present illustrated example embodiment, two securing bolts 3 are pre-installed in the assembly 1. FIG. 3 shows a detailed view of a single securing bolt 3, which includes a bolt shaft 3.2 having a threading provided thereon, a bolt head 3.1 having a first tool engagement configuration in the form of an external hex head at a first end of the shaft 3.2, and a free shaft end 3.3 having a second tool engagement configuration at the second end of the shaft 3.2. The threading of the bolt shaft 3.2 can be a self-cutting or self-tapping threading.

The first tool engagement configuration provided on the bolt head 3.1 is used for pre-installing the bolt 3 in the assembly 1. To preinstall the securing bolt 3, at least a portion of the shaft 3.2 is turned or threaded into a corresponding bolt hole provided in the assembly 1, so that at least a few threads or pitches of the threading engage into the assembly 1. However, in the pre-installed condition, a portion of the bolt shaft 3.2 will remain exposed and protruding from the assembly 1, so that the bolt head 3.1 remains spaced away from the mounting surface 1A of the assembly 1. This leaves a certain spacing S between the bolt head 3.1 and the mounting surface 1A, which is greater than the thickness T of the support 2 by at least a tolerance amount. With this arrangement, it is possible to slidingly engage the securing bolts 3 into the keyhole-shaped openings 5 provided in the support 2, as will be described below.

The second tool engagement configuration provided on the free shaft end 3.3 of each securing bolt 3 is used for the final tightening of the securing bolt 3 from the side of the assembly 1 opposite the mounting surface 1A. In other words, once the assembly 1 has been mounted on the support 2, the securing bolts 3 can be tightened from the free ends 3.3 thereof, even if the bolt heads 3.1 are in a totally "blind" and inaccessible location. The second tool engagement configurations provided on the free shaft ends 3.3 may be configured as external hex heads, internal hex sockets, or as a Torx configuration head as shown in the present example.

It is particularly advantageous if the securing bolt 3 has a left-hand threading provided on its shaft 3.2, because then a conventional right-hand or clockwise rotation of the tool engagement configuration provided on the free end 3.3 of the bolt 3 will have the effect of tightening the bolt head toward the assembly 1 with the support 2 clampingly held therebetween. Thus, by providing a left-hand threading on the bolt shaft 3.2, the final securing of the bolts 3 is facilitated, and can be carried out with typical wrenches or rachets, including power driven tools, that conventionally are designed to tighten bolts in a clockwise rotation direction. Of course, a right-hand threading could alternatively be provided on the shaft 3.2 of the bolt. It is also possible to use securing bolts having a tool engagement configuration on only one end thereof, for example in an installation in which the bolt head side of the arrangement will be accessible.

Of the several securing bolts 3 pre-installed in the assembly 1, at least one of these bolts is covered by a safety cap 4. In the illustrated example, exactly one of the two bolts 3 is provided with a safety cap 4. The advantages of the present invention will be achieved, even if only one of the several bolts is equipped with a safety cap, as long as this bolt that was initially equipped with a safety cap is the bolt that is tightened first once the assembly 1 is mounted on the support 2.

As seen more particularly in FIGS. 1 and 2, and understood further in connection with FIG. 4, it is apparent that the safety cap 4 is releasably or removably pushed onto the securing bolt 3 in a manner so as to at least partially cover or enclose the bolt 3. In the preferred embodiment in which the bolt 3 has two tool engagement configurations respectively on the bolt head 3.1 and the free shaft end 3.3, the safety cap 4 is correspondingly configured to include safety covers 4.1 and 4.4 at the two opposite ends thereof for respectively covering the tool engagement configurations at opposite ends of the bolt.

FIG. 2 shows a top view of the assembly 1 with the pre-installed securing bolts 3 and the safety cap 4 arranged on one of the bolts. FIG. 2 further shows a top view of the support 2 having keyhole-shaped openings 5 therein. Each opening 5 includes a first larger portion 5.1 that has an opening diameter or dimension large enough so that the bolt head 3.1 of the bolt 3 can be inserted through this first portion 5.1 of the opening 5. Each opening 5 further includes a second narrower elongate portion 5.2 that extends from the first larger portion 5.1. The width of the narrower portion 5.2 is dimensioned so that the shaft 3.2 of the securing bolt 3 can be received therein, yet the bolt head 3.1 cannot pass through the narrower portion 5.2 in a direction perpendicular to the plane of the support 2. Therefore, once the bolt 3 is arranged with the shaft 3.2 extending through the narrower portion 5.2 of the opening 5, then the bolt head 3.1 can be screwed or bolted tight toward the assembly 1, with the support 2 received and clampingly held between the bolt head 3.1 and the mounting surface 1A of the assembly 1. In this arrangement, the bolt head 3.1 reaches behind the support 2 along the sides of the narrower portion 5.2 of the opening 5.

In the illustrated example, two securing bolts 3 are provided in the assembly 1, and therefore correspondingly, two openings 5A and 5B are provided in the support 2. The general discussion of the keyhole-shaped opening 5 above applies to each of the illustrated openings 5A and 5B. However, it should further be noted that the opening 5B is larger than the opening 5A. Particularly, the larger portion 5.1B of the opening 5B is large enough to receive not only the bolt head 3.1, but also the safety cover 4.1 of the safety cap 4 inserted therein, i.e. extending therethrough. The configuration of the narrower elongate portion 5.2A the opening 5A corresponds to that of the narrower elongate portion 5.2B of the opening 5B.

The support 2 preferably additionally has a guide slot or guide opening 6 provided therein, to cooperate with a guide pin 7 protruding from the mounting surface 1A of the assembly 1. As the assembly 1 is mounted on the support 2 so that the bolt heads 3.1 pass through the larger portions 5.1 of the openings 5, the guide pin 7 is simultaneously inserted into the guide slot or opening 6. Then, as the assembly 1 is slidingly displaced relative to the support 2 so as to engage the bolt shafts 3.2 in the narrower portions 5.2 of the openings 5, the guide pin 7 slides along the elongation direction of the guide slot or opening 6. Thus, the elongation direction of the guide opening 6 defines the lateral sliding movement direction of the assembly 1 relative to the support 2, and extends parallel to the elongation direction of each one of the narrower elongate portions 5.2 of the openings 5.

FIG. 4 is illustrates the situation in which the shafts 3.2 of the securing bolts 3 have been pushed or engaged into the narrower portions 5.2 of the openings 5 so that the bolt heads 3.1 (shown in dashed lines) are engaged behind the support 2, whereby the final tightening of the bolts 3 will achieve a large-surface clamping of the assembly 1 against the support 2 (also see FIG. 7B). As the assembly 1 is pushed toward the left relative to the support 2 in the view of FIG. 4, i.e. as the shaft of the securing bolt is pushed from the larger portion 5.1B into the narrower portion 5.2B of the opening 5B, the edges or rims 5.4B of the opening 5B at the area of the transition or junction between the larger portion 5.1B and the narrower elongate portion 5.2B act as a stop for the safety cap 4.

Preferably, a stop groove 4.5 of the safety cap 4 is pushed over the stop rim 5.4B as the bolt 3 and the safety cap 4 move toward the left in FIG. 4, but once the end stop 4.3 provided at the end of the stop groove 4.5 contacts against the stop rim 5.4B of the opening 5B, a counterforce is exerted so that the safety cap 4 remains in place as the assembly 1 and respective bolt 3 are moved further to the left. As a result, the press fit or friction fit engagement of the safety cap 4 on the securing bolt 3 is overcome and the safety cap 4 is pushed off of the bolt 3, or actually the securing bolt 3 is pulled out of the safety cap 4. The safety cap 4 can then be pulled, or falls freely, out of the larger opening portion 5.1B, as suggested in the view of FIG. 4.

Preferably, the tool engagement surfaces of the bolt head 3.1 of the securing bolt 3 are first uncovered or exposed by removal of the safety cap 4 once the bolt shaft 3.2 has been inserted entirely to the end of the narrower elongate opening portion 5.2B, i.e. into the position shown in FIGS. 4 and 7B. From the mounting or assembly side, i.e. the side of the arrangement from which the assembly 1 is mounted onto the support 2, the installation worker who is working on the conveyor or assembly line can barely (or not at all) determine with the naked eye whether the bolt head 3.1 is entirely and properly seated behind the support 2 with a large surface contact therebetween, and with the bolt shaft 3.3 entirely pushed against the end of the narrower opening portion 5.2B.

Nonetheless, due to the inventive safety cap 4, the respective bolt 3 that was provided with the safety cap 4 can only be tightened if the bolt 3 is precisely in its proper position. Namely, a bolt tightening tool inserted from the non-visible side of the arrangement can only come into engagement with the tool engagement configuration of the bolt head 3.1 after the safety cap 4 has been removed from the bolt 3 by the cooperation of the stop surfaces 4.3 and 5.4B as discussed above. Similarly, a tool can only be applied to tighten the bolt from the tool engagement configuration provided on the free shaft end 3.3, once the safety cap 4 has been removed so that the second safety cover 4.4 no longer covers the shaft end 3.3. Thus, the bolt can only be tightened if it is in its proper position, because the safety cap 4 covers the tool engagement configuration thereof until the bolt is in the proper position.

The several views of FIGS. 5A, 5B, 5C, 6A and 6B clearly illustrate the particular configuration of the present example embodiment of the safety cap 4. However, it should be understood that the configuration of the safety cap 4 can be adapted for any particular application, as long as the inventive functions thereof are achieved. It is essential for effectively carrying out the method according to the invention, that the safety cap 4 includes at least one safety cover 4.1 to cover at least one tool engagement configuration. Here the safety cover 4.1 is in the form of a hollow cylinder that is closed on one side and that has a hollow recess 4.2 in which the bolt head 3.1 of the bolt 3 can be removably received or engaged. A second hollow partial cylindrical portion 4.6 of the body of the safety cap 4 is configured to reach around or receive therein a protruding lug portion 1.2 of the assembly 1, through which the bolt 3 extends. The above mentioned stop slot or groove 4.5 cuts into the side walls of the safety cap 4 between the two partial cylindrical body portions 4.1 and 4.6. The end of the safety cap 4 opposite the hollow partial cylindrical safety cover 4.1 is provided with a second safety cover 4.4, that serves to cover the free shaft end 3.3 of the bolt 3, and simultaneously provides a counter clamping force so that the safety cap 4 can be clampingly engaged against both ends of the bolt 3, i.e. with the bolt 3 releasably held between the safety covers 4.1 and 4.4.

The width of the stop slot or groove 4.5 is slightly larger than the thickness T of the support 2, and the position of the stop groove or slot 4.5 relative to the safety covers 4.1 and 4.4 corresponds exactly to the position of the support 2 relative to the opposite ends of the bolt 3 once the assembly 1 has been mounted on the support 2. The depth of the stop slot or groove 4.5, i.e. the position of the end stop 4.3, is selected to ensure that the safety cap 4 will only be pushed off of the bolt by the cooperation of the end stop 4.5 contacting the opening rim 5.4B once the securing bolt 3 has been slidingly pushed very far and preferably all the way toward the end of the narrower elongate portion 5.2 of the opening 5. This cooperation of the end stop 4.3 with the opening rim 5.4B can be further understood by considering the sectional view of FIG. 6A in combination with FIG. 4.

FIG. 7A illustrates the position of the bolt 3 only partially inserted into the narrower elongate portion 5.2 of the opening 5. A tightening of the bolt 3 in such a position is to be avoided by the invention. Particularly, FIG. 7B shows the proper complete insertion of the bolt 3 to the very end of the narrower portion 5.2 of the opening 5, so as to achieve the maximum possible surficial contact between the bolt head 3.1 and the back surface of the support 2. Preferably, the inventive safety cap 4 only is released from and thereby exposes the bolt head 3.1 to be tightened once the bolt has reached the proper position shown in FIG. 7B.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A combination comprising an assembly, a first securing bolt pre-installed in said assembly, a safety cap for said first securing bolt, and a support on which said assembly is to be mounted, wherein:
    said first securing bolt comprises a bolt head and a bolt shaft, includes a first tool engagement configuration, and is pre-installed in said assembly with one portion of said bolt shaft received in said assembly and another portion of said bolt shaft protruding from said assembly so that said bolt head is spaced away from said assembly;
    said safety cap is configured and adapted to be removably fitted onto said first securing bolt and includes a first safety cover that is configured and adapted to cover said first tool engagement configuration of said first securing bolt;
    said support has a first opening therein, which includes a wider opening portion that is large enough to allow said bolt head of said first securing bolt as well as at least a portion of said safety cap to be inserted therein and a narrower opening portion that adjoins said wider opening portion and that has a width which is wide enough to receive said bolt shaft of said first securing bolt extending therethrough and narrow enough to prevent said bolt head of said first securing bolt from passing therethrough; and
    said assembly, said first securing bolt, said safety cap and said support are so configured, arranged and adapted such that said bolt head together with said safety cap fitted onto said first securing bolt can be inserted into said wider opening portion, then said assembly can be moved relative to said support so as to move said bolt shaft into said narrower opening portion, and said safety cap is released from said first securing bolt so that said first safety cover exposes said first tool engagement configuration when said bolt shaft has been moved into said narrower opening portion.

2. The combination according to claim 1, wherein said safety cap and said first opening are so configured such that said safety cap is released from said first securing bolt only when said bolt shaft has been moved entirely to an end of said narrower opening portion opposite said wider opening portion.

3. The combination according to claim 1, wherein said portion of said safety cap adapted to be inserted into said wider opening portion extends along said bolt shaft and said bolt head and has a width dimension smaller than said wider opening portion and larger than said width of said narrower opening portion.

4. The combination according to claim 1, wherein said support includes a stop rim bounding said wider opening portion at an area thereof adjoining said narrower opening portion, said safety cap includes an end stop surface that is configured, arranged and adapted to contact said stop rim and prevent further motion of said safety cap relative to said support as said first securing bolt is moved in said narrower opening portion.

5. The combination according to claim 4, wherein said safety cap includes a hollow partial cylindrical body adapted to at least partially receive said bolt head therein and to extend along said bolt shaft, said hollow partial cylindrical body has a slot therein with said end stop surface forming a closed end of said slot, said slot has a width greater than a thickness of said support adjacent to said stop rim, and said slot is adapted to receive said thickness of said support therein to a point at which said stop rim contacts said end stop surface as said bolt shaft is moved in said wider opening portion.

6. The combination according to claim 5, wherein said assembly includes an assembly body and a partial cylindrical lug protruding from said assembly body, said first securing bolt is pre-installed in said assembly with said bolt shaft received in a bolt hole in said lug, and said partial cylindrical body of said safety cap is configured and adapted to receive said lug at least partially therein.

7. The combination according to claim 4, wherein said stop rim comprises a straight rim edge extending perpendicularly to an elongation axis of said narrower opening portion, said wider opening portion has a shape of a part of a circle terminated along said straight rim edge which forms a chord of said circle, and said narrower opening portion has a shape of an elongated U-shaped slot opening into said wider opening portion.

8. The combination according to claim 1, wherein said first tool engagement configuration is provided on said bolt head, said first securing bolt further comprises a second tool engagement configuration provided at an end of said bolt shaft opposite said bolt head, said first safety cover of said safety cap is adapted to removably cover at least a part of said bolt head, and said safety cap further includes a second safety cover that is arranged at an end of said safety cap opposite said first safety cover and that is adapted to removably cover at least a part of said second tool engagement configuration.

9. The combination according to claim 8, wherein said bolt shaft has a left-handed threading provided thereon.

10. The combination according to claim 1, further comprising a second securing bolt pre-installed in said assembly, wherein said second securing bolt includes a second bolt head and a second bolt shaft, said support has a second opening therein which includes a second wider opening portion that is large enough to allow said second bolt head to be inserted therethrough and a second narrower opening portion that has a width which is wide enough to receive said second bolt shaft extending therethrough and narrow enough to prevent said second bolt head from passing therethrough, and there is no second safety cap provided for said second securing bolt.

11. The combination according to claim 10, wherein said wider opening portion of said first opening is larger than said second wider opening portion of said second opening, and said second wider opening portion is not wide enough to allow said portion of said safety cap to be inserted therein.

12. The combination according to claim 1, wherein said support further has an elongated guide slot therein extending parallel to an elongation axis of said narrower opening portion, said assembly has a mounting surface adapted to contact said support when said assembly is mounted on said support, and said assembly further has a guide pin protruding from said mounting surface and adapted to slidingly engage said guide slot when said assembly is mounted on said support.

13. The combination according to claim 1, wherein said safety cap further includes a second safety cover, said first and second safety covers are on axially opposite ends of said safety cap and are spaced apart from each other at a spacing distance to receive an axial length of said first securing bolt therebetween with a friction fit.

14. The combination according to claim 1, wherein:
   said portion of said safety cap adapted to be inserted in said wider opening portion comprises said first safety cover, which is adapted to at least partially removably cover said bolt head;
   said safety cap further includes a second safety cover at an end of said safety cap opposite said first safety cover, and a cap body that adjoins said first safety cover, has a first stop surface, and has a width that is narrower than said wider opening portion and wider than said narrower opening portion; and
   a rim of said support bounding said wider opening portion acts as a counter stop that contacts said first stop surface and pushes said safety cap off of said first securing bolt when said bolt shaft moves from said wider opening portion into said narrower opening portion.

15. The combination according to claim 14, wherein said cap body has a hollow partial cylindrical shape that is at least partly closed at an end by said first safety cover and that has a hollow chamber therein adapted to removably receive said bolt head therein, said cap body further includes a divider wall that extends parallel to said first safety cover and has a U-shaped opening adapted to receive said bolt shaft therein, and said cap body has a slot therein adjacent said divider wall with said first stop surface located at an end of said slot.

16. The combination according to claim 15, wherein at least one of said hollow chamber and said safety covers are so dimensioned and arranged so as to be adapted to achieve a friction press fit of said safety cap on said first securing bolt, which is overcome and released when said first stop surface contacts said counter stop while said bolt shaft is moved from said wider opening portion to said narrower opening portion.

17. The combination according to claim 14, wherein said cap body comprises a hollow partial cylinder that is open on one cylinder side thereof to allow insertion and removal of said first securing bolt therein.

18. The combination according to claim 1, wherein said safety cap, further comprising a hollow partial cylindrical body, a second safety cover, wherein said, and first and second safety covers are respectively arranged at axially opposite ends of said body, wherein said body surrounds a hollow chamber therein adapted to receive said bolt head and said body shaft therein, wherein said first and second safety covers are spaced apart from each other and adapted to receive said first securing bolt axially therebetween, wherein said body has an open side through which said first securing bolt can be moved into and out of said hollow chamber, and wherein said body has a slot therein extending from said open side along a plane perpendicular to a central axis of said body.

19. A method of manipulating said combination according to claim 1 so as to securely mount said assembly on said support, comprising the following steps:
   a) removably fitting said safety cap onto said first securing bolt which has been previously pre-installed in said assembly, so that said first safety cover at least partially covers said first tool engagement configuration;
   b) mounting said assembly onto said support so that said bolt head of said first securing bolt and at least a part of said first safety cover is inserted into said wider opening portion of said opening in said support; and
   c) moving said assembly relative to said support so that said bolt shaft moves from said wider opening portion into said narrower opening portion, while contacting a part of said safety cap against a part of said support so that said first safety cover is removed from and exposes said first tool engagement configuration as said assembly is moved relative to said support.

20. The method according to claim 19, wherein said step c) further comprises causing said safety cap to be pushed off of said first securing bolt due to said contacting of said part of said safety cap against said part of said support as said assembly is moved relative to said support.

21. The method according to claim 19, wherein said first safety cover exposes said tool engagement configuration only once said bolt shaft has been moved entirely to an end of said narrower opening portion opposite said wider opening portion.

* * * * *

UNITED STATES PATENT AND TRADEMARK OFFICE
CERTIFICATE OF CORRECTION

PATENT NO. : 6,193,198 B1
DATED : February 27, 2001
INVENTOR(S) : Baur et al.

Page 1 of 1

It is certified that error appears in the above-identified patent and that said Letters Patent is hereby corrected as shown below:

Under (56) References Cited
U.S. PATENT DOCUMENTS, please add -- 1,732,993  10/1929  Spiro et al. --;
FOREIGN DOCUMENTS, please add -- 29714824  11/1997 (DE);

Column 3,
Line 3, after "of", insert -- the --;

Column 5,
Line 26, after "5.2A", insert -- of --;

Signed and Sealed this

Twenty-eighth Day of August, 2001

*Attest:*

*Attesting Officer*

NICHOLAS P. GODICI
*Acting Director of the United States Patent and Trademark Office*